United States Patent
Appukuttan et al.

(10) Patent No.: US 9,328,978 B2
(45) Date of Patent: May 3, 2016

(54) HEAT EXCHANGER

(71) Applicant: ROLLS-ROYCE PLC, London (GB)

(72) Inventors: Ajith Appukuttan, Derby (GB); Yi Wang, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 282 days.

(21) Appl. No.: 13/848,530

(22) Filed: Mar. 21, 2013

(65) Prior Publication Data

US 2013/0306265 A1    Nov. 21, 2013

(30) Foreign Application Priority Data

May 16, 2012   (GB) .................................. 1208586

(51) Int. Cl.
*F28F 27/02* (2006.01)
*F02C 7/14* (2006.01)

(52) U.S. Cl.
CPC .. *F28F 27/02* (2013.01); *F02C 7/14* (2013.01)

(58) Field of Classification Search
CPC ..................... F24F 2011/0043; F24F 2265/16; F28D 15/06
USPC ............................ 165/11.1, 70, 140, 285, 286
See application file for complete search history.

(56) References Cited

U.S. PATENT DOCUMENTS

| | | | |
|---|---|---|---|
| 2,948,516 A * | 8/1960 | Martinelli et al. .......... | 165/11.1 |
| 3,916,638 A | 11/1975 | Schmidt | |
| 4,072,183 A * | 2/1978 | Fraas ...................... | F22B 1/063 122/33 |
| 8,333,210 B1 * | 12/2012 | Henkel et al. ............. | 137/15.11 |
| 2010/0243095 A1 * | 9/2010 | Bourlart ........................ | 138/104 |
| 2012/0048530 A1 * | 3/2012 | Hagshenas et al. ........... | 165/285 |

FOREIGN PATENT DOCUMENTS

| CN | 201181168 Y | 1/2009 |
|---|---|---|
| WO | WO 2004/074755 A2 | 9/2004 |
| WO | WO 2008/061362 A1 | 5/2008 |

OTHER PUBLICATIONS

Aug. 15, 2012 Search Report issued in British Patent Application No. 1208586.6.

* cited by examiner

*Primary Examiner* — Judy Swann
*Assistant Examiner* — John Higgins
(74) *Attorney, Agent, or Firm* — Oliff PLC

(57) ABSTRACT

The invention relates to a heat exchanger 10, comprising: a first unit 12 having a first conduit 16 for passing a flow of a first fluid through the first unit 12; a second unit 14 having a second conduit 28 for passing a flow of a second fluid through the second unit 28, wherein the flow of the first fluid is isolated from the second unit 14 and the flow of the second fluid is isolated from the first unit 12; and, a third conduit 40 connecting the first 12 and second 14 units, wherein the third conduit 40 is for carrying a flow of an intermediate fluid between the first 12 and second 14 units so as to transfer heat between the first fluid and the second fluid, when in use.

11 Claims, 1 Drawing Sheet

HEAT EXCHANGER

TECHNICAL FIELD OF INVENTION

This invention relates to a heat exchanger. In particular, this invention relates to a heat exchanger for use in applications where heat exchange is between two fluids which cannot be intermixed in the event of a failure. In one example, the invention is employed to transfer heat between a fuel supply and a flow of compressed air in a gas turbine engine.

BACKGROUND OF INVENTION

It is known to use fuel as a coolant in gas turbine engines and more specifically, to use a fuel and air heat exchanger arrangement to cool hot compressed air in gas turbine engines. However, there exist concerns over possible hazards in the event of a damaged heat exchanger. Such hazards might include fire or contamination of fuel or air flow.

The present invention seeks to address these concerns.

STATEMENTS OF INVENTION

In a first aspect, the present invention relates to a heat exchanger, comprising: a first unit having a first conduit for passing a flow of a first fluid through the first unit; a second unit having a second conduit for passing a flow of a second fluid through the second unit, wherein the flow of the first fluid is isolated from the second unit and the flow of the second fluid is isolated from the first unit; and, a third conduit connecting the first and second units, wherein the third conduit is for carrying a flow of an intermediate fluid between the first and second units so as to transfer heat between the first fluid and the second fluid, when in use.

In use, the heat exchanger may further comprise the first, second and intermediate fluids. The intermediate fluid may be kept at a lower pressure than the first and second fluids. The first fluid may be at a higher pressure than the second fluid.

The heat exchanger may further comprise a sensor for determining a condition of the intermediate fluid. The sensor may be configured to detect the pressure of the intermediate fluid. That is, the sensor may be a pressure sensor. The pressure sensor may be configured to detect the pressure of the intermediate fluid within the either of the first or second units.

The first fluid may be a combustible fuel. The combustible fuel may be for use in a combustion engine. The combustion engine may be a gas turbine engine. The combustible fuel may be kerosene. The second fluid is a compressed gas. The compressed gas may be the compressed air taken from a compressor of a gas turbine engine. The compressed air may be bled from any stage of the compressor of the gas turbine.

The heat exchanger may further comprise an isolating valve in the third conduit. The isolating valve may be operable to break the intermediate fluid flow path. The heat exchanger may further comprise a one way valve in the third conduit. The one way valve may be the same as the isolating valve.

The sensor may be an aeration sensor.

The isolating valve may be operable upon a predetermined level of aeration in the intermediate fluid.

The heat exchanger may further comprise a bypass conduit for bypassing one of either the first or second units.

In a second aspect, the present invention provides a method of controlling the flow of fluid within a heat exchanger, comprising: a first unit having a first conduit for passing a flow of a first fluid through the first unit; a second unit having a second conduit for passing a flow of a second fluid through the second unit, wherein the flow of the first fluid is isolated from the second unit and the flow of the second fluid is isolated from the first unit; and, a third conduit connecting the first and second units, wherein the third conduit is for carrying a flow of an intermediate fluid between the first and second units so as to transfer heat between the first fluid and the second fluid, the method comprising the steps of: passing a first fluid flow through the first unit; passing a second through the second unit; and, passing an intermediate fluid flow through the third conduit.

The method may further comprise monitoring the pressure of the fluid flows so that the first fluid is at a higher operating pressure than the second fluid, and the second fluid flow is at a higher operating pressure than the intermediate fluid flow. The pressure of the intermediate fluid may be monitored to determine leak between either or both of the first and third conduit, and the second and third conduits.

DESCRIPTION OF DRAWINGS

Embodiments of the invention will now be described with the aid of the flowing drawings in which.

DETAILED DESCRIPTION OF INVENTION

Figure 1:
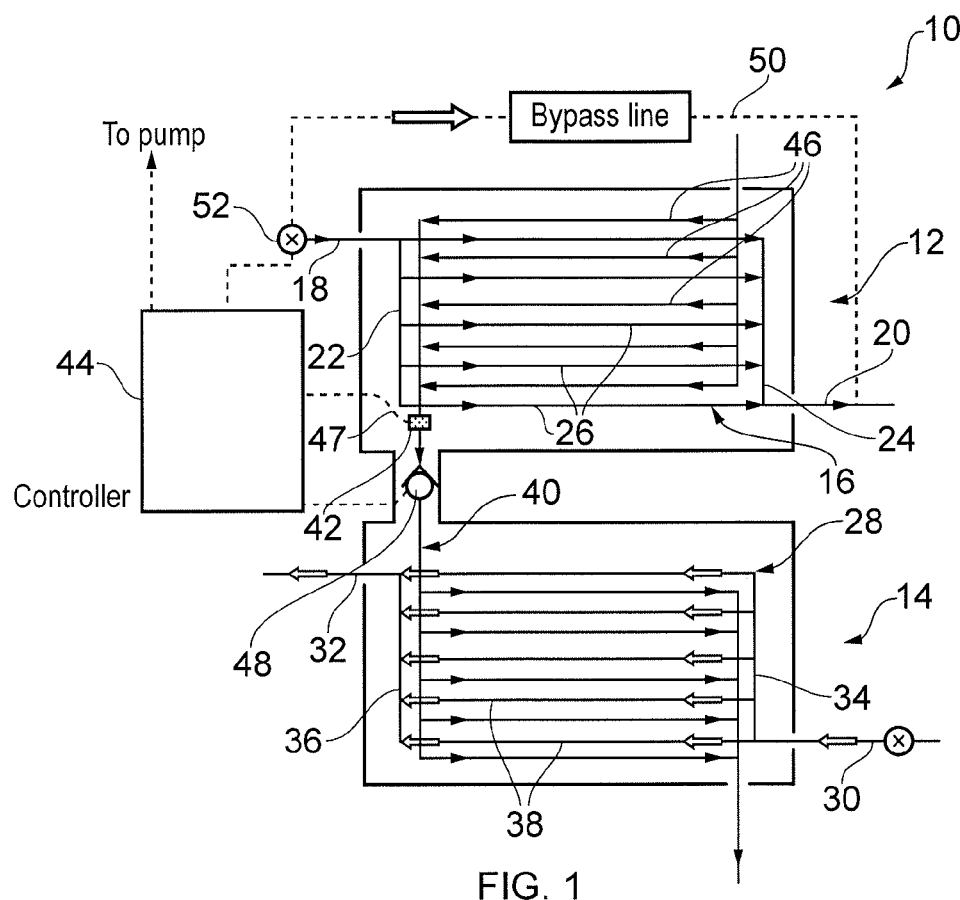
FIG. 1 shows a heat exchanger according to the present invention.

Thus, in FIG. 1 there is shown a schematic representation of a heat exchanger 10 according to the present invention. The heat exchanger 10 includes a first unit 12 and a second unit 14. The first unit 12 includes a first fluid path way in the form of a conduit 16 which is provided to receive a flow of a first fluid (not shown), when in use. The conduit 16 of the embodiment includes an inlet 18 and an outlet 20 which connect to respective inlet 22 and outlet 24 manifolds. The inlet 22 and outlet 24 manifolds are connected by parallel conduits 26 so as to provide fluid flow channels between the two manifolds 22, 24 and allow the first fluid to pass through or be circulated around the first unit 12 when in use. It will be appreciated that pass through should be taken to include pass around or a circulation of fluid, for example.

The second unit 14 of the embodiment includes a similar schematic arrangement of conduits 28 as the first unit 12. Thus, there is an inlet 30 and an outlet 32, each having a respective manifold 34, 36, and a plurality of parallel conduits 38 connecting the two manifolds 34, 36 so as to allow a parallel flow of fluid therebetween. The arrangement is such that a flow of a second fluid can be passed through the second unit 14 when in use.

The first and second conduits 16, 28 are isolated from the other the respective unit 12, 14. Hence, the first flow of fluid cannot pass into the second unit 14, and the second flow of fluid cannot pass into the first unit 12. In this way, the heat exchanger 10 can be used to exchange heat between two fluids which, for whatever reason, cannot, or should not, be mixed. Hence, in the embodiment described below, the heat exchanger 10 is used in a gas turbine engine 210 (FIG. 2) to cool a flow of compressed air with the fuel. Ordinarily this would need to be prevented for safety reasons and associated consequences of accidentally mixing the compressed air and fuel. Such consequences might include a leak of fuel into the airflow of the engine or a contamination of the fuel being supplied to the injector. The consequence might also include hazardous onset of fire in the heat exchanger as a result of fuel mixing with compressed air.

The use of the heat exchanger 10 of the invention in a gas turbine engine 210 is particularly advantageous as the heat generated in compressing the air can be recuperated. Further, the cooled compressed air can then be used to cool other parts of the engine 110 such as the turbine discs, blades or bearing chambers etc.

In order to transfer heat between the first 12 and second 14 units a third, or intermediary fluid pathway in the form of a conduit 40 connects the units 12, 14 and channels thermal energy therebetween. Hence, the third conduit 40 passes between the first unit 12 and the second unit 14 and is arranged to carry a flow of a third, intermediary fluid (not shown). The intermediary fluid provides a function of transferring heat between the first 12 and second units 14. Hence, the third conduit 40 includes a connecting branch 42 which extends from within and between the first 12 and second 14 units. Within each of the first 12 and second 14 units, the respective ends of the connecting branch 42 are coupled with a plurality of parallel conduits 46 in a similar way to the schematic arrangement of the first 16 and second 28 conduits. To provide a flow of fluid in the third conduit 40, the conduit 40 is in fluid communication with a pump (not shown) or the like via suitable connections. It will be appreciated that the pump could form part of the heat exchanger 10.

To control the fluid flows in the first 16, second 28 and third conduits 40, the heat exchanger 10 includes a control system having a controller 44 which forms part of a larger heat exchanger system. The controller 44 can be of any suitable form but will typically include at least one processing means and some memory for storing instructions for executing the required control philosophy.

The controller 44 is in communication with several elements of the heat exchanger system so as to receive and send the desired inputs and outputs required. The means of communication may include hardwired connections or may be achieved wirelessly as depending on the application. Various connections between some of the elements and the controller 44 are indicated by dashed lines by way of example.

It will be appreciated that the flow rates through the respective units may be controlled by the controller 44 and that the controller 44 may constitute inputs and outputs from other control systems. Hence, for example, the flow of a first fluid may be predetermined by an external factor such as a flow of coolant. Also, the control system of the invention may be a sub-system of a larger control system.

As described above, it is an advantage of the present invention that an intermixing of the two fluids can be prevented during use. In order to monitor the integrity of the system and determine whether the first 12 and second 14 units are operating properly, each unit 12, 14 includes a sensing arrangement having a sensor for determining the condition of the intermediate fluid.

In one embodiment, the sensor is in the form of a pressure sensor 47 in the first unit which is configured to detect the pressure in the intermediary fluid. The pressure sensor is in communication with the controller 44 and provides it with which is indicative of the pressure of the intermediary fluid. Predetermined limits are assigned within the controller 44 in accordance with acceptable limits for the normal operation of the heat exchanger 10, that is, when there are no leaks and the integrity of the conduits are intact. Thus, if there is a pressure differential between the intermediary fluid and the first and second fluids in use, the monitored pressure of the intermediary fluid allows for the detection of a breakdown and pressure leak in the first 16 and second 28 conduits. Equally, if the third conduit 40 breaks down then this will also be detected.

It will be appreciated that the predetermined limits will be application specific and will depend on the expected range of pressure given the operating conditions of the heat exchanger 10.

In a preferred embodiment, the intermediary fluid is kept at a lower pressure than the first and second fluids such that a pressure increase will be experienced within the intermediary fluid if there is a leak from either of the first or second conduits. In this event, it will be possible to correct for or negate the effects of the leak before an undesirable circumstance is arrived at. Having the pressure of the intermediary fluid at a lower pressure is particularly advantageous as it means that fluid will leak from the either of the first or second conduits into the third conduit, thereby avoiding any contamination, rather than the third fluid passing into the first or second conduits.

With the above described invention, it may be advantageous to have an intermediary fluid which does not react to either of the first or second fluids. Thus, there is no reaction in the event of a leak.

A further feature of the heat exchanger 10 of the embodiment is the inclusion of a one way valve 48 in the connecting portion of the third conduit 40. The one way valve 48 is operable to allow the flow of fluid in one direction only and as such, in the described embodiment, is arranged to prevent a flow of fluid from the second unit 14 to the first unit 12. In ordinary operation, the intermediary fluid is passed from the first unit 12 to the second unit 14. If there is a leak in the second unit 14, then the intermediary fluid cannot be forced back through to the first unit 12.

The one way valve 48 may also be operable to isolate the flow of intermediate fluid when required, for example, when a leak is detected in one of the first 12 or second 14 units The third fluid pathway 40 may include a sensor or sensing arrangement to detect the conditions other than pressure. Such sensing arrangements may include any known useful sensing such as the constitution of the fluid to determine whether there has been a leak. In one embodiment, this sensor may advantageously be an aeration sensor which is configured in conjunction with the control system to detect the presence a gas within the fluid. In this way, if, for example, one of the fluids is a gas and a small leak is present which escapes the detection of the pressure change for some reason, then the aeration can be detected and prevent flow of the aerated fluid into the first unit. In one advantageous embodiment, the aeration sensor forms part of the one way valve 48 in the connection portion of the third conduit 40.

The first unit 12 of the embodiment also includes a bypass conduit 50 to allow the first fluid to bypass the first unit in the event of a failure. The bypass conduit 50 is connected to the first conduit 16 via a valve 52. The valve 52 is arranged to receive a signal from a controller 44 which is provided when the pressure in the third fluid 40 exceeds a predetermined limit.

Figure 2:
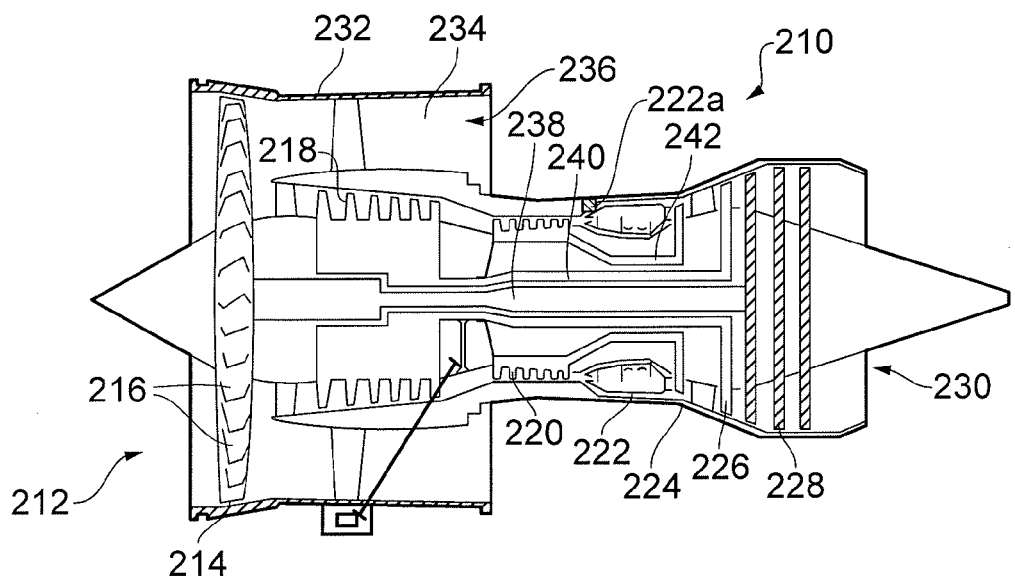
FIG. 2 shows a conventional gas turbine engine in which the invention may be utilised.

FIG. 2 shows a ducted fan gas turbine engine 210 comprising, in axial flow series: an air intake 212, a propulsive fan 214 having a plurality of fan blades 216, an intermediate pressure compressor 218, a high-pressure compressor 220, a combustor 222, a high-pressure turbine 224, an intermediate pressure turbine 226, a low-pressure turbine 228 and a core exhaust nozzle 230. A nacelle 232 generally surrounds the engine 210 and defines the intake 212, a bypass duct 234 and a bypass exhaust nozzle 236.

Air entering the intake 212 is accelerated by the fan 214 to produce a bypass flow and a core flow. The bypass flow travels down the bypass duct 234 and exits the bypass exhaust nozzle 236 to provide the majority of the propulsive thrust produced by the engine 210. The core flow enters in axial flow series the intermediate pressure compressor 218, high pressure compressor 220 and the combustor 222, where fuel is added to the compressed air and the mixture burnt. The hot combustion products expand through and drive the high, intermediate and low-pressure turbines 224, 226, 228 before being exhausted through the nozzle 230 to provide additional propulsive thrust. The high, intermediate and low-pressure turbines 224, 226, 228 respectively drive the high and intermediate pressure compressors 220, 218 and the fan 214 by interconnecting shafts 238, 240, 242.

A heat exchanger 222a is located on the outer wall of the combustor 222 and is of a shell and tube type construction. Such a heat exchanger is capable of handling high pressures which would be experienced in the gas turbine application. In one embodiment the first unit 12 is arranged to receive a flow of fuel which is to be delivered to the combustor and as such may be required to handle pressure between 8.9 MPa (1300 psi) to 3.1 MPa (450 psi). The second unit is arranged to receive a flow of compressed air from one of the compressor stages and as such may be required to handle pressures between 5.17 MPa (750 psi) and 1.38 MPa (200 psi). As will be appreciated from the description above, the pressure of the intermediate fluid is preferably below the lowest expected pressure for both the first and second units such that the pressure sensing fault detection technique described above can be utilised. The intermediary fluid may be any fluid which may fulfil the technical requirements which will be appreciated from the above description. In one embodiment the intermediary fluid is inert and has high thermal conductivity. Typical fluids include but are not limited to ionic fluids, ionanofluids, and water and glycol mixes. The fluid in first unit 12 could be the fuel supply to the combustion chamber, and the fluid in the second unit 14 could be the compressed air bled from the compressor of the gas turbine. The heat exchanger is located on the combustor outer casing.

It will be appreciated that the above representation is schematic and although the arrangements are described as being similar, in a working heat exchanger, the sizes and configurations of the first, second and third conduits may be application specific and markedly different. For example, the second conduit may comprise manifolds which deliver air to the inlet of a corrugated matrix in which the third conduit is closely thermally coupled.

It will be apparent from this that the term conduit is not to be taken to be limiting and encompasses passages, passageways, channels, pipes and tubes or any other structure which is configured to channel a flow of fluid in the way described above. Indeed, the intermediate fluid is may simply be contained by the housings of the first and second units and circulated within, rather than being with a tube or the like.

The invention claimed is:

1. A heat exchanger, comprising:
   a first unit having a first conduit for passing a flow of a first fluid through the first unit;
   a second unit having a second conduit for passing a flow of a second fluid through the second unit, wherein the flow of the first fluid is isolated from the second unit and the flow of the second fluid is isolated from the first unit;
   a third conduit connecting the first and second units, wherein the third conduit is for carrying a flow of an intermediate fluid between the first and second units so as to transfer heat between the first fluid and the second fluid, when in use;
   wherein the third conduit comprises a connecting branch extending from within and between the first unit and second unit;
   a sensor for determining a condition of the intermediate fluid, the condition of the intermediate fluid being indicative of a presence or an absence of a leak of the first fluid of the first unit and/or the second fluid of the second unit,
   a valve positioned in the connecting branch between the first unit and second unit for directing flow of the intermediate fluid; and
   a controller in communication with the sensor and the valve, the controller is operable, when the sensor detects a change in the condition which exceeds a pre-defined limit, the pre-defied limit being indicative of a leak of the first fluid of the first unit and/or the second fluid of the second unit, to operate the valve and alter the flow path of the intermediate fluid, wherein the valve is selected from;
   a) a one way valve operable to prevent flow of fluid from the second unit to the first unit and/or backflow of the intermediate fluid to the first unit; or
   b) an isolating valve operable to isolate flow of the intermediate fluid.

2. A heat exchanger as claimed in claim 1, further comprising the first, second and intermediate fluids, wherein the intermediate fluid is at a lower pressure than the first and second fluids when in use.

3. A heat exchanger as claimed in claim 1, wherein the sensor is configured to detect the pressure of the intermediate fluid.

4. A heat exchanger as claimed in claim 2 wherein first fluid is a combustible fuel.

5. A heat exchanger as claimed in claim 2 wherein the second fluid is a compressed gas.

6. A heat exchanger as claimed in claim 1, wherein the sensor is an aeration sensor.

7. A heat exchanger as claimed in claim 1 wherein a second valve is an isolating valve operable to open a bypass conduit for bypassing one of either the first or second units.

8. A method of controlling the flow of fluid within a heat exchanger, comprising:
   a first unit having a first conduit for passing a flow of a first fluid through the first unit;
   a second unit having a second conduit for passing a flow of a second fluid through the second unit, wherein the flow of the first fluid is isolated from the second unit and the flow of the second fluid is isolated from the first unit;
   a third conduit connecting the first and second units, wherein the third conduit is for carrying a flow of an intermediate fluid between the first and second units so as to transfer heat between the first fluid and the second fluid, wherein the third conduit comprises a connecting branch extending from within and between the first unit and second unit;
   a sensor for determining a condition of the intermediate fluid, the condition being indicative of a presence or an absence of a leak of the first fluid of the first unit and/or the second fluid of the second unit,
   a valve positioned in the connecting branch between the first unit and second unit for directing flow of the intermediate fluid; and
   a controller in communication with the sensor and the valve, the controller is operable, when the sensor detects a change in the condition which exceeds a pre-defined limit, the pre-defied limit being indicative of a leak of the first fluid of the first unit and/or the second fluid of the second unit, to switch the valve and alter the flow path of the intermediate fluid, wherein the valve is selected from;

a) a one way valve operable to prevent flow of fluid from the second unit to the first unit and/or backflow of the intermediate fluid to the first unit; or
b) an isolating valve operable to isolate flow of the intermediate fluid, the method comprising the steps of:

passing a first fluid flow through the first unit;

passing a second through the second unit;

passing an intermediate fluid flow through the third conduit;

monitoring the integrity of the system using the sensor, in response to the sensor determining that a pre-defined limit for the condition has been exceeded, switching the valve and thereby altering the flow path of the intermediate fluid.

9. A method as claimed in claim 8, further comprising configuring the pressure of the fluid flows so that the first fluid is at a higher operating pressure than the second fluid, and the second fluid flow is at a higher operating pressure than the intermediate fluid flow.

10. A method as claimed in claim 9, wherein the condition determined is the pressure of the intermediate fluid which is monitored to determine leak between either or both of the first and third conduit, and the second and third conduits.

11. A method as claimed in claim 8, wherein the sensor is arranged to detect the aeration of the intermediate fluid.

* * * * *